United States Patent Office 3,082,073
Patented Mar. 19, 1963

3,082,073
METHOD OF INCREASING EFFICIENCY
OF PIPELINES
Adrian W. McAnneny, Houston, Tex., assignor to Trunkline Gas Company, Houston, Tex., a corporation of Delaware
Filed Apr. 20, 1961, Ser. No. 104,462
7 Claims. (Cl. 51—317)

This invention relates to an improved method for increasing the efficiency of a pipeline by using a sandblasting technique. In one of its aspects, it relates to such a method wherein transient flow conditions of a sand laden gas are generated and utilized to more effectively sand blast the end section of the pipeline nearest the inlet for the gas and sand.

It has been known that the surface roughness of the interior wall of a pipeline has a marked effect on the efficiency of the pipeline. The work of the U.S. Bureau of Mines as revealed in Nomograph 9 indicates that in the turbulent flow region for natural gas, the transmission or efficiency factor is a function of surface roughness and is independent of Reynolds number. It has been found that this is true where the interior of the pipeline has substantial roughness of the order of that found in pipe as it comes from the mill. However, it has also been found that when a sandblasting technique is practiced upon a pipeline, the transmission or efficiency factor in the turbulent flow region is not only a function of surface roughness, but also of Reynolds number when it is in the range normally employed in commercial gas transmission line operation. In other words, the sandblasting causes the interior walls of the pipe to approach the smoothness of a theoretically perfectly smooth wall pipe and the transmission factor increases with Reynolds number.

As indicated above, sandblasting pipe of diameters commonly in use by gas transmission companies improves the efficiency or transmission factor by not only removing rust and scale, but also smoothing the metal surface of the inner wall of the pipeline. Thus, the sand is carried along parallel to the inner metal surface of the pipeline and tends to polish or "peen" down local surface irregularities. If the roughness of an inner wall of a pipe is visualized as consisting of many minute peaks separated by valleys, a sand grain traveling parallel to the metal surface will strike the peaks and tend to smooth them out, thereby making the interior of the pipe quite smooth. This smoothing by sand flow parallel to the metal surface is to be contrasted with the usual sandblasting technique wherein the sand is impinged at a substantial angle on the metal surface, thereby actually creating the peaks and valleys mentioned above instead of eliminating them.

In the scheme heretofore proposed for sandblasting transmission lines, it was the practice to flow a gas, such as air, into one end of a pipeline section and to exhaust it to the atmosphere several miles from the inlet. When the pressure at the inlet end of the section had reached a desired steady state value, said was then suspended in the inflowing gas to be carried through the pipeline and discharged at the outlet. While this effectively cleaned the outlet end of the line, it was difficult, if not impossible, to obtain efficient cleaning of the inlet end. As the length of the sections of pipe to be sandblasted becomes longer, it becomes increasingly difficult to maintain the sand in suspension and clean the pipe at the inlet end. Longer lengths produce a greater total resistance to flow, thereby increasing the inlet pressure. The increased pressure compresses the gas at the inlet end and there is very little increase in inlet velocity. This problem becomes particularly aggravated when natural gas is used instead of air because of the lower gravity of the natural gas.

In addition, there is another disadvantage in using the foregoing technique. This arises from the fact that the length of each section of line being cleaned is limited. If a section too long in length is attempted to be cleaned, the gas velocity at the inlet becomes too low even though the inlet pressure may be increased. For example, using natural gas at a low pressure of the order of twenty to thirty pounds per square inch, the maximum length of a 26 inch line section which could be cleaned by the foregoing technique would be about eight miles. Therefore, it was necessary to make frequent moves of the sandblasting equipment when a long length of line was being sandblasted.

It is an object of this invention to provide an improved method for sandblasting pipelines in place in order to increase the efficiency or transmission factor thereof and particularly, to improve the factor at the end of the pipeline wherein the gas and sand are being injected.

Another object is to provide such a method which will permit longer sections of pipeline to be sandblasted and yet, the inlet portion of each section will have adequate gas velocity to insure proper cleaning and smoothing thereof.

Another object of the invention is to provide such a method wherein the number of moves of equipment to clean a long length of pipeline can be substantially reduced, thereby reducing the cost of the operation and also affording a wider choice of sites at which the sandblasting equipment is to be moved onto the right-of-way.

Other objects, advantages and features of the invention will be apparent to one skilled in the art upon studying this specification and claims as well as the drawings wherein:

Figure 1:
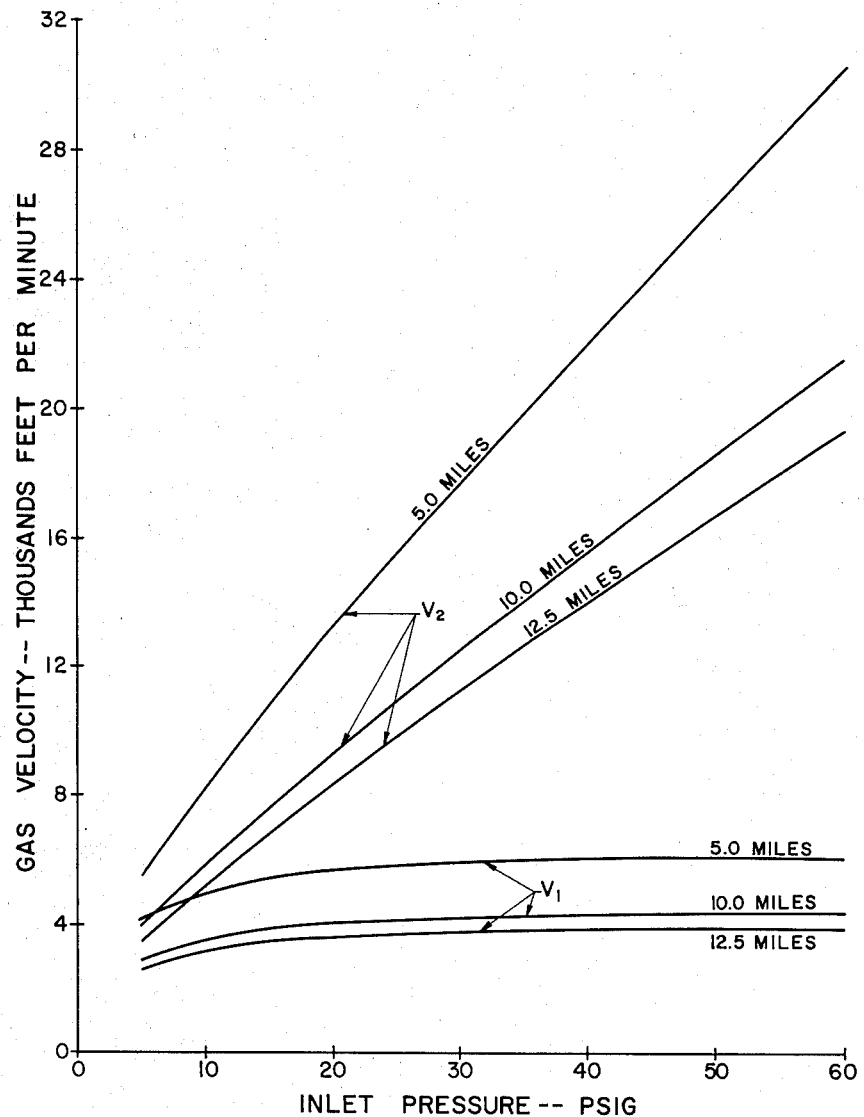
FIG. 1 is a plot showing the variation of gas velocity with inlet pressure and length of pipeline for a 26 inch by $\frac{5}{16}$ inch wall thickness pipe, the outlet pressure being atmospheric.

Before discussing the details of the invention, reference is made to FIG. 1. In this figure, the inlet velocity at the inlet end of the pipeline is denoted by $V_1$ and the outlet velocity at the outlet from the pipeline as $V_2$, the outlet pressure being atmospheric. These velocities are those which exist after natural gas has been flowing through the pipeline for a sufficient period of time that the inlet pressure has stabilized at the values indicated on the abscissa. It will be noted that the inlet pressure for a ten-mile section of pipeline must be at least twenty pounds before even a minimum sandblasting velocity is achieved, namely four thousand feet per minute. At this inlet pressure, the outlet velocity is slighlty over nine thousand feet per minute which is quite acceptable. However, the four thousand feet per minute velocity at the inlet will not cause the pipeline to be sandblasted as adequately as will the higher outlet velocity which is considered much more desirable. In fact, velocities of four thousand feet per minute have been found insufficient to do the best job of increasing the efficiency of the pipeline. It might be supposed that by increasing the inlet pressure, the inlet velocity could be markedly increased. However, the plot shows that even when the inlet pressure is increased to sixty pounds, the inlet velocity is still only about 4300 feet per minute, whereas the outlet velocity is about 21,500 feet per minute and in many cases, this outlet velocity would be considered excessive.

In accordance with this invention, inlet velocities of the order of the outlet velocities are created by setting up transient flow conditions in the pipeline during the actual sandblasting of the pipeline. These transient conditions are created by control of two principal factors. First, the inlet to and the outlet from the pipeline section being sandblasted are spaced sufficiently far apart such that the pipeline section has considerable "capacity." By "capacity" is meant that at a predetermined flow rate into the pipeline, an interval of time is required before the inlet pressure can build up to a steady state value even though the outlet is full open. Then by also choosing the inlet flow rate to be such that a significant time interval is required for the inlet pressure to achieve a steady state value and then subsequently shutting off the inlet gas, a transient flow condition in the pipeline will be created. Thus, when gas is first turned into the pipeline section, it will be traveling at the inlet end of the section at a relatively high velocity of the order of $V_2$ shown in FIG. 1. Then by suspending sand in the gas during the time the pressure is building up at the inlet, it will be seen that the inlet section of the pipe will be sandblasted at relatively high particle velocity. As the inlet pressure gradually increases, the inlet velocity will decrease to a value $V_1$ as shown in FIG. 1 when the inlet pressure reaches the values of FIG. 1. Then after the inlet velocity has substantially decreased, and it may be even permitted to decrease to a value corresponding to that of the selected inlet pressure, the inflowing of gas is interrupted so that with the outlet discharging to the atmosphere, the inlet pressure will decrease such as to atmosphere or other low value. During this operation, sand is suspended in the inlet gas from the time such gas is initially turned into the line until at least the major part of the transient velocity has been experienced at the inlet.

After the inlet pressure has been reduced, preferably to a low value approaching atmospheric pressure, gas is again admitted at the inlet and sand suspended therein to repeat the operation. The number of cycles to be used in cleaning any given section of the pipeline will depend upon a number of factors, such as the initial roughness of the pipeline, the amount of rust and scale present, the desired degree of increase in pipeline efficiency factor, etc.

As an example of the foregoing technique, a section of 30 inch pipeline of approximately 10 miles in length was cleaned. Gas was admitted to the pipeline through a 4 inch valved line with sufficient pressure ahead of the valve that the gas was flowing at critical velocity through the valve. Approximately six to eight minutes were required for the inlet pressure to increase and stabilize at its maximum value and during this period, sand was suspended in the gas. The further suspension of sand was then stopped and the gas permitted to flow into the line for about three minutes longer. The gas was then turned off and it required about three minutes for the inlet pressure to decay to atmospheric pressure. These cycles were repeated for approximately one hour and it was found that the transmission or efficiency factor had increased to a value which was greater than that accomplished with three hours of sandblasting from one end of a comparable section of pipeline under steady state conditions with sand being added during the entire period.

Figure 2:
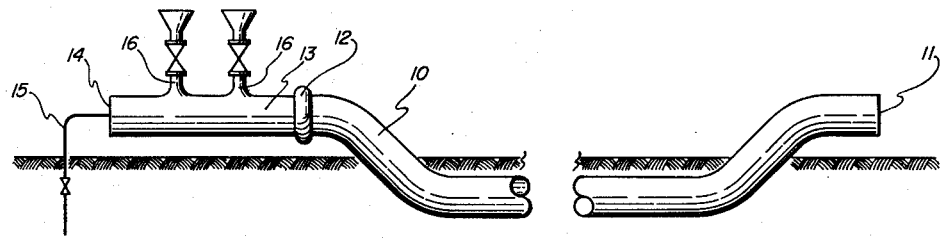
FIG. 2 is a schematic illustration of a pipeline having apparatus connected thereto for practicing the preferred form of the instant invention.

Referring now to FIG. 2, there is shown the preferred form of the apparatus connected to a pipeline for practicing the invention. Thus, a section of pipeline 10 has an outlet 11 open to the atmosphere and an inlet 12 connected to a section of pipe 13. The latter is provided with a closed end 14 to which is connected a valved inlet gas line 15. The latter is connected to a suitable source of natural gas supply. The pipe 13 has one or more valved side outlets 16 through which sand can be dumped into the pipe. Thus, by opening the side outlets 16, sand can be deposited in pipe 13 before gas is turned thereinto. Then after the side outlets have been closed, gas can be admitted through line 15 into pipe 13 where it will pick up sand lying therein so that the sand will be suspended in the gas to clean the pipeline.

Other means can be used for suspending the sand in the gas, such as an external hopper arrangement, etc. However, the foregoing is preferred because of its simplicity.

Figure 3:
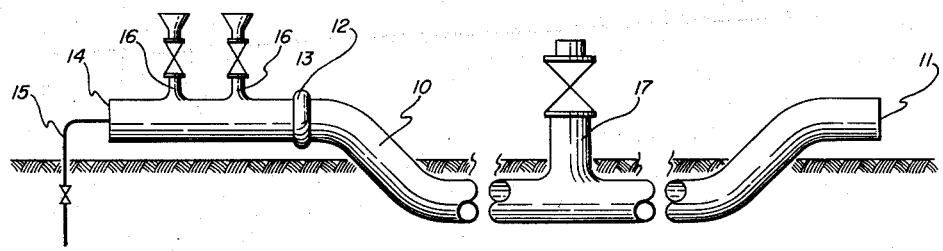
FIG. 3 shows another version of such pipeline arrangement.

In FIG. 3 is shown another form of the apparatus for practicing this invention. In this view, a side outlet 17 is provided for the pipeline intermediate the outlet 11 and inlet 12. For this arrangement, gas from line 15 can be admitted to pipe 13 to pick up sand and then to flow from inlet 12 through side outlet 17 which is open to atmosphere. After the inlet pressure has reached substantially a steady state value, the side outlet 17 can be closed, after which the sand and gas then will traverse the remainder of the pipeline to be discharged from outlet 11.

The use of intermediate outlet 17 in effect reduces the length of the pipeline seen by inlet 12 when the outlet 17 is open. This causes a higher velocity at the inlet end of the pipeline during an initial portion of the sandblasting operation and yet permits the entire length of the pipeline to be sandblasted at suitable velocities. More than one intermediate outlet may be used if desired.

While sand of various particle size can be used, it is preferred that it have a particle size such that substantially all of it will pass a 30 mesh screen and substantially all will be retained on a 70 mesh screen. Of course, the particle size distribution between these two mesh sizes can vary, but it is preferred that it be concentrated in the smaller particle size portion of the range.

It has been found that after the sand has been used for sandblasting, such as by passing through ten miles of 26 inch pipe, the sand particles are broken up so that, for example, starting with the above-sized sand, about 10% will pass a 200 mesh sieve and only about ¾ will be retained on a 70 mesh sieve. Nevertheless, microscopic examination of the particles indicates that they are even sharper than those of the original sand. This increase in sharpness is due to fracturing of the sand along its crystal planes, resulting in very sharp edges. Thus, the effectiveness of the sand is not lost as it moves down the pipe, but on the contrary, with increased sharpness and velocity, its ability to clean and polish the pipe interior becomes more effective.

The amount of sand to be used will vary with the internal conditions of the pipeline. Usually, an amount within the range of four to forty thousand pounds will be found practical for the majority of pipelines.

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

As many possible embodiments of the invention may be made without departing from the scope thereof, it is to be understood that all matter herein set forth or shown in the accompanying drawings is to be interpreted as illustrative and not in a limiting sense.

The invention having been described, what is claimed is:

1. A method of increasing the efficiency of a pipeline which comprises establishing a gas inlet to and a gas outlet from the pipeline at a sufficient distance apart that when gas is admitted to the inlet, at least several minutes are required for gas in the pipeline to achieve steady state flow conditions with the velocity of gas in the pipe adjacent to the inlet substantially lower than that of gas in the pipe adjacent to the outlet at such conditions, periodically admitting gas through said inlet at rates of flow and for individual time intervals of such length that the gas pressure in the line adjacent to the inlet continuously increases to a substantially higher value than that at the outlet at the end of each interval; spacing said intervals apart sufficiently that the gas pressure in the pipe adjacent to the inlet decreases to a value approaching that of gas in the pipe adjacent to the outlet between said intervals, and suspending sand in said gas at the inlet during at least the initial portion of said intervals whereby the pipeline adjacent the inlet is subjected to the action of said sand while traveling at relatively high velocities during said initial interval portion.

2. The method of claim 1 wherein gas is admitted for a period of time after the suspension of sand at the inlet ceases.

3. The method of claim 1 wherein a second outlet is established from the pipeline intermediate the inlet and the first-mentioned outlet and wherein the second outlet is opened during an initial portion of an interval and then is closed after the gas pressure at the inlet has increased.

4. A method of increasing the efficiency of a pipeline which comprises establishing a gas inlet to and a gas outlet from a pipeline at a sufficient distance apart that at a predetermined gas flow rate into the inlet, sufficient pressure drop occurs at steady state conditions between the inlet and outlet that the velocity of the gas in the pipeline at the inlet is substantially less than that at the outlet, flowing gas into the inlet at a rate sufficient to constantly increase pressure of gas in the pipe adjacent to the inlet while simultaneously suspending sand therein, interrupting the flow of gas into the inlet after the pressure in the pipe adjacent to the inlet has increased substantially over that in the pipe adjacent to the outlet while continuing to flow gas from the outlet until the inlet pressure falls to a value approaching that at the outlet, and repeating the foregoing steps of flowing gas into the inlet and interrupting such flow.

5. A method of increasing the efficiency of a pipeline which comprises establishing a gas inlet to and a first gas outlet from a pipeline at a sufficient distance apart that at a predetermined gas flow rate into the inlet, at least several minutes are required for gas in the pipeline to achieve steady state flow conditions with the velocity of the gas in the pipe adjacent to the inlet substantially lower than that in the pipe adjacent to the outlet, establishing a second outlet from the pipeline intermediate said inlet and first outlet, flowing gas into the pipeline through said inlet at a rate sufficient to constantly increase pressure in the line adjacent to the inlet while simultaneously suspending sand therein, flowing gas from said second outlet until the pressure at the inlet has increased substantially and then closing the second outlet and flowing gas from the first outlet.

6. A method of increasing the efficiency of a pipeline which comprises establishing an inlet to and an outlet from a pipeline at a distance of several miles apart so that when a gas is admitted to the inlet, a substantial time of the order of at least several minutes is required for the pipeline to achieve steady state flow conditions, admitting gas at the inlet at a rate of flow sufficient to increase gas pressure in the line adjacent to the inlet to substantially steady state value while at the same time suspending sand in the gas beginning with the initial quantity of gas admitted and terminating when the pressure at the inlet has increased to a substantially steady state value, continuing to admit gas thereafter, ceasing to so admit gas until the inlet pressure has been reduced to substantially its original value and then repeating the above steps so that the pipeline is subjected to a cyclic sandblasting.

7. The method of claim 6 wherein said sand is initially deposited as a mass in the pipeline adjacent said inlet before said gas is admitted so that it is gradually entrained by the gas as the latter is admitted.

References Cited in the file of this patent
UNITED STATES PATENTS
1,890,164     Rosenberger _____ Dec. 6, 1932